(12) United States Patent
Kanai et al.

(10) Patent No.: US 12,456,584 B2
(45) Date of Patent: Oct. 28, 2025

(54) THIN FILM POLYMER LAMINATED CAPACITOR AND MANUFACTURING METHOD THEREFOR

(71) Applicant: RUBYCON CORPORATION, Ina (JP)

(72) Inventors: Toshihito Kanai, Ina (JP); Arina Hayakawa, Ina (JP); Tomonao Kako, Ina (JP)

(73) Assignee: RUBYCON CORPORATION, Ina (JP)

( * ) Notice: Subject to any disclaimer, the term of this patent is extended or adjusted under 35 U.S.C. 154(b) by 0 days.

(21) Appl. No.: 18/874,668

(22) PCT Filed: Jul. 11, 2023

(86) PCT No.: PCT/JP2023/025579
§ 371 (c)(1),
(2) Date: Dec. 13, 2024

(87) PCT Pub. No.: WO2024/014457
PCT Pub. Date: Jan. 18, 2024

(65) Prior Publication Data
US 2025/0259791 A1    Aug. 14, 2025

(30) Foreign Application Priority Data
Jul. 11, 2022    (JP) .................... 2022-111232

(51) Int. Cl.
*H01G 4/18*    (2006.01)
*C08F 220/30*    (2006.01)
(Continued)

(52) U.S. Cl.
CPC .......... *H01G 4/18* (2013.01); *C08F 220/301* (2020.02); *C08F 222/102* (2020.02); *C09D 4/00* (2013.01);
(Continued)

(58) Field of Classification Search
None
See application file for complete search history.

(56) References Cited

U.S. PATENT DOCUMENTS

| | | | |
|---|---|---|---|
| 4,490,774 A | 12/1984 | Olson et al. | |
| 4,842,893 A * | 6/1989 | Yializis | B05D 3/068 |
| | | | 427/255.6 |

(Continued)

FOREIGN PATENT DOCUMENTS

| | | |
|---|---|---|
| CN | 114051648 A | 2/2022 |
| JP | S60-157106 A | 8/1985 |

(Continued)

OTHER PUBLICATIONS

Oct. 10, 2023 International Search Report issued in International Patent Application No. PCT/JP2023/025579.

(Continued)

*Primary Examiner* — Dion R. Ferguson
(74) *Attorney, Agent, or Firm* — Oliff PLC (57) ABSTRACT

The present invention pertains to a thin-film polymer laminated capacitor having a structure in which a resin thin film layer and an internal electrode metal layer are alternately laminated. The resin thin film layer has a high molecular weight structure obtained through polymerization of a first monomer which is a polyfunctional monomer and a second monomer which is a monofunctional monomer. The first monomer and the second monomer satisfy at least one of conditions (a) and (b). (a) The HLB value $H_2$ of the second monomer is less than the HLB value $H_1$ of the first monomer. (b) By using the following manufacturing method (1), when a first polymer member formed by using only the first monomer as the monomer and a second polymer member formed by using only the second monomer as the monomer are manufactured, and the water absorption rate of each of the polymer members is measured after being left still at 40°

(Continued)

C. for 40 hours at 95%-relative humidity, the water absorption rate of the second polymer member is lower than the water absorption rate of the first polymer member. Here, the manufacturing method (1) comprises; providing the first monomer or the second monomer as a test monomer, obtaining a mixture by mixing a photoinitiator at a proportion of 0.2±0.01 mol with respect to 100 mol of the test monomer, pouring the mixture in a round plate; and creating a disc shaped polymer member having a dimension of diameter 30 mm×depth 1 mm by irradiating, with UV, the mixture poured in the round plate in a nitrogen atmosphere at 120 W and from a distance of 250 mm until progress of polymerization stops.

12 Claims, 1 Drawing Sheet

(51) Int. Cl.
    *C08F 222/10*     (2006.01)
    *C09D 4/00*     (2006.01)
    *C09D 133/14*     (2006.01)
    *C09D 135/02*     (2006.01)
    *H01G 4/30*     (2006.01)

(52) U.S. Cl.
    CPC ......... *C09D 133/14* (2013.01); *C09D 135/02* (2013.01); *H01G 4/306* (2013.01); *C08F 2800/10* (2013.01)

(56) References Cited

U.S. PATENT DOCUMENTS

| | | | |
|---|---|---|---|
| 2003/0045648 A1* | 3/2003 | Hayakawa | C08F 8/00 525/333.9 |
| 2011/0127068 A1* | 6/2011 | Wada | C09C 3/10 526/323.2 |
| 2017/0025224 A1 | 1/2017 | Tomimoto et al. | |
| 2023/0265314 A1* | 8/2023 | Ki | G02B 1/04 257/40 |

FOREIGN PATENT DOCUMENTS

| | | |
|---|---|---|
| JP | H07-26193 A | 1/1995 |
| JP | H09-194759 A | 7/1997 |
| JP | H1-1199799 A | 7/1999 |
| JP | 2000-216049 A | 8/2000 |
| JP | 2017-033966 A | 2/2017 |
| JP | 2021-019133 A | 2/2021 |
| WO | 2015/118693 A1 | 8/2015 |
| WO | WO-2024014457 A1 * | 1/2024 ............ C08F 220/18 |

OTHER PUBLICATIONS

Apr. 5, 2025 Office Action issued in Chinese Patent Application No. 202380052358.6.

* cited by examiner

THIN FILM POLYMER LAMINATED CAPACITOR AND MANUFACTURING METHOD THEREFOR

TECHNICAL FIELD

The present invention relates to a thin-film polymer laminated capacitor and a method of manufacturing the same.

BACKGROUND ART

As a capacitor, one having a structure in which dielectric layers containing a resin and electrode layers containing a metal are alternately laminated is known.

Patent Document 1 describes a thin-film polymer laminated film capacitor and a method for producing the same. This document describes a method for producing a thin-film polymer laminated film capacitor, wherein the method includes alternately and repeatedly performing, on a rotary drum, a step of vapor-depositing a monomer in a vacuum chamber to form a monomer layer and then irradiating the monomer layer with an electron beam to cure the monomer layer so as to form a resin thin film layer and a step of vapor-depositing a metal material to form a metal thin film layer, in order to produce a laminate in which the resin thin film layers and the metal thin film layers are alternately laminated on the rotary drum.

Patent Document 2 discloses a capacitor provided with two electrodes separated by a dielectric member. This document describes that the dielectric member comprises a polymer of a polyfunctional acrylate having a specific chemical structure.

CITATION LIST

Patent Literature

Patent Document 1: International Publication WO2015/118693
Patent Document 2: JP S 60-157106A

Technical Problem

With conventional thin-film polymer laminated capacitors, there have been cases where they could not provide sufficient performances in terms of durability. In particular, with conventional thin-film polymer laminated capacitors formed using a polyfunctional monomer, there have been cases where they could not provide sufficient durability. Further, with conventional capacitors, it was difficult to provide a capacitor having sufficient durability while exhibiting good electrical characteristics.

An object of the present invention is to provide a thin-film polymer laminated capacitor having sufficient electrical performances required for a thin-film polymer laminated capacitor and having improved durability.

Solution to Problem

The above problem can be solved by the following embodiments according to the present invention.

Embodiment 1

A thin-film polymer laminated capacitor having a structure in which resin thin film layers and internal electrode metal layers are alternately laminated, wherein the resin thin film layers have a polymer structure formed by a polymerization of a first monomer which is a polyfunctional monomer and a second monomer which is a monofunctional monomer, and wherein the first monomer and the second monomer satisfy at least one of the following conditions (a) and (b):

(a) an HLB value $H_2$ of the second monomer is less than an HLB value $H_1$ of the first monomer;
(b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) consists of:

providing the first monomer or the second monomer as a test monomer;
mixing a photoinitiator in a ratio of 0.2±0.01 moles to 100 moles of the test monomer, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

Embodiment 2

The capacitor according to Embodiment 1, wherein a difference between the HLB value $H_1$ of the first monomer and the HLB value $H_2$ of the second monomer ($H_1$-$H_2$) is 0.1 or more.

Embodiment 3

The capacitor according to Embodiment 2, wherein the difference ($H_1$-$H_2$) is 0.5 or more.

Embodiment 4

The capacitor of any one of Embodiments 1 to 3, wherein the HLB value $H_1$ of the first monomer is in the range of 3.0 to 5.0, and the HLB value $H_2$ of the second monomer is in the range of 2.0 to 4.0.

Embodiment 5

The capacitor of any one of Embodiments 1 to 4, wherein the molar ratio of the first monomer to the second monomer is 10:90 to 90:10.

Embodiment 6

The capacitor of any one of Embodiments 1 to 5, wherein at least one of the first monomer and the second monomer has an acrylate group or a methacrylate group, or at least one of the first monomer and the second monomer comprises a monomer having an acrylate group or a methacrylate group.

Embodiment 7

The capacitor according to Embodiment 6, wherein both the first monomer and the second monomer have an acrylate group or a methacrylate group, or both the first monomer and the second monomer comprise a monomer having an acrylate group or a methacrylate group.

Embodiment 8

The capacitor according to any one of Embodiments 1 to 7, wherein the first monomer is a bifunctional monomer.

Embodiment 9

The capacitor according to any one of Embodiments 1 to 8, wherein
the first monomer is tricyclodecanedimethanol diacrylate or tricyclodecanedimethanol dimethacrylate, or the first monomer comprises tricyclodecanedimethanol diacrylate or tricyclodecanedimethanol dimethacrylate; and/or
the second monomer is 2-(biphenyl-2-yloxy)-ethyl acrylate or 4-phenylbenzyl acrylate, or the second monomer comprises 2-(biphenyl-2-yloxy)-ethyl acrylate or 4-phenylbenzyl acrylate.

Embodiment 10

The capacitor according to any one of Embodiments 1 to 9, wherein, for a third polymer member produced according to the following manufacturing method (2), when being left for 40 hours under the conditions of 40° C. and 95% relative humidity, the water absorption rate of the third polymer member is 0.8% or less, wherein the manufacturing method (2) consists of:
providing the first monomer and the second monomer;
mixing the first monomer and the second monomer at the same ratio as the molar ratio in the resin thin film layer, in order to obtain a monomer mixture;
mixing a photoinitiator in a ratio of 0.2±0.01 moles to 100 moles of the monomer mixture, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

Embodiment 11

The capacitor according to any one of Embodiments 1 to 10, wherein the capacitor has a relative permittivity of 2.0 or more as measured at 25° C. and 1 kHz, and tan δ of less than 1.0% as measured at 25° C. and 1 kHz.

Embodiment 12

A method of manufacturing a thin-film polymer laminated capacitor having a structure in which resin thin film layers and internal electrode metal layers are alternately laminated,
wherein the method comprises curing a monomer layer comprising a first monomer which is a polyfunctional monomer and a second monomer which is a monofunctional monomer, in order to form the resin thin film layer;
and wherein the first monomer and the second monomer satisfy at least one of the following conditions (a) and (b):

(a) an HLB value $H_2$ of the second monomer is less than an HLB value $H_1$ of the first monomer,
(b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) consists of:
providing the first monomer or the second monomer as a test monomer;
mixing a photoinitiator in a ratio of 0.2±0.01 moles to 100 moles of the test monomer, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to obtain a disk-shaped polymer member with dimensions of 30 mm diameter×1 mm depth.

Advantageous Effects of Invention

According to the present invention, it is possible to provide a thin-film polymer laminated capacitor having sufficient electrical performances required for a thin-film polymer laminated capacitor and having improved durability.

MODE FOR CARRYING OUT THE PRESENT INVENTION

Thin-Film Polymer Laminated Capacitor
The thin-film polymer laminated capacitor of the present disclosure has a structure in which resin thin film layers and internal electrode metal layers are alternately laminated,
wherein the resin thin film layers have a polymer structure formed from a polymerization of a first monomer which is a polyfunctional monomer and a second monomer which is a monofunctional monomer,
and wherein the first monomer and the second monomer satisfy at least one of the following conditions (a) and (b):
(a) an HLB value $H_2$ of the second monomer is less than an HLB value $H_1$ of the first monomer;
(b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) consists of:

providing the first monomer or the second monomer as a test monomer;

mixing a photoinitiator in a ratio of 0.2±0.01 moles to 100 moles of the test monomer, in order to obtain a mixture;

pouring the mixture into a round dish; and irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

With conventional capacitors, there were cases where it was not possible to obtain a capacitor having good durability. In particular, with conventional capacitors manufactured using a polymer obtained from a polyfunctional monomer, although it may be possible to obtain a polymer structure of resin thin film layers having a relatively high degree of crosslinking, there were cases where it was not possible to obtain a capacitor having good durability.

On the other hand, according to the present invention, it is possible to provide a thin-film polymer laminated capacitor having sufficient performances required for a thin-film polymer laminated capacitor and having improved durability.

More specifically, in the capacitor satisfying the above condition (a), the resin thin film layers are formed using not only a polyfunctional monomer but also a monofunctional monomer having a relatively low HLB value. Without wishing to be bound by theory, it is believed that, in this case, a sufficient degree of crosslinking of a polymer structure in the resin thin film layers can be ensured due to the polyfunctional monomer, and a reduced water absorption of the resin thin film layers can also be obtained due to polymer units derived from the monofunctional monomer having a relatively low HLB, and consequently, excellent durability can be achieved.

Further, in the capacitor of the present invention satisfying the condition (b) above, the resin thin film layers are formed using not only a polyfunctional monomer but also a monofunctional monomer which forms a polymer exhibiting relatively low water absorption. Without wishing to be bound by theory, it is believed that, in this case, a sufficient degree of crosslinking of a polymer structure in the resin thin film layers can be ensured due to the polyfunctional monomer, and a reduced water absorption of the resin thin film layers can also be obtained due to polymer units derived from the monofunctional monomer, and consequently, excellent durability can be achieved.

Further, without wishing to be bound by theory, it is believed that, when a monofunctional monomer is contained, shrinkage of the resin thin film layer due to curing is suppressed and generation of internal stress is suppressed as compared with a case where only a polyfunctional monomer is used, and as a result, warpage and cracking are reduced and delamination in the capacitor can be prevented or suppressed. In this case, it is believed that, since the intrusion of moisture into the cracked portion or the delaminated portion is suppressed, the water absorption rate of the capacitor can be further effectively suppressed.

The method according to the present disclosure will be described in more detail below.

First Monomer and Second Monomer

The resin thin film layer has a polymer structure formed by polymerization of a first monomer which is a polyfunctional monomer and a second monomer which is a monofunctional monomer. Preferably, the proportion of monomer units derived from the first monomer and monomer units derived from the second monomer is, in molar ratio, 80% or more, 85% or more, 90% or more, or 95% or more, and is particularly preferably 100%, based on all the monomer units constituting the polymer structure of the resin thin film layer.

The polyfunctional monomer has a plurality of (in particular two) polymerizable functional groups in a molecule. The monofunctional monomer has one polymerizable functional group in a molecule.

Examples of the polymerizable functional group include a vinyl group (particularly, an acrylic group, a methacrylic group, an acrylate group, and a methacrylate group), an acrylonitrile group, and an epoxy group. Preferably, the polyfunctional monomer and/or monofunctional monomer has at least either an acrylate group or a methacrylate group. Most preferably, both the polyfunctional monomer and the monofunctional monomer have an acrylate group. It should be noted that a monomer having an acrylate group is an acrylate monomer and a monomer having a methacrylate group is an methacrylate monomer.

The polyfunctional monomer and the monofunctional monomer can be polymerized via a polymerizable functional group under conditions such as electron beam irradiation, in order to form a polymer.

The ratio of the first monomer to the second monomer, namely, the ratio of the polyfunctional monomer to the monofunctional monomer, can be appropriately set according to characteristics desired for a capacitor.

The molar ratio of the first monomer to the second monomer is preferably 10:90 to 90:10. This molar ratio is more preferably 20:80 to 80:20, 30:70 to 70:30, 40:60 to 60:40, or 45:55 to 55:45.

In other words, the number of moles of the second monomer relative to the total number of moles of the first monomer and the second monomer is preferably 10 to 90%, 20 to 80%, 30 to 70%, 40 to 60%, or 45 to 55%.

When the ratio of the first monomer to the second monomer is in the above range, it is possible to provide a capacitor having good electrical characteristics and particularly excellent durability.

Polyfunctional Monomer

The polyfunctional monomer is in particular a bifunctional monomer. The polyfunctional monomer preferably has an acrylate or methacrylate group. The polyfunctional monomer most preferably has an acrylate group. In another embodiment, the polyfunctional monomer preferably comprises a monomer having an acrylate or methacrylate group or consists of a monomer having an acrylate or methacrylate group. The polyfunctional monomer most preferably comprises or consists of a monomer having an acrylate group.

In one embodiment according to the present disclosure, the polyfunctional monomer may have a chemical structure represented by the following general Formula (1):

[Chem. 1]

In Formula (1),
$R^1$ is a group containing 1 to 20 carbon atoms;
$R^2$ is H or $CH_3$;
n is 2 to 4.

In Formula (1), n is preferably 2 to 3, more preferably n=2.

In Formula (1), $R^1$ preferably contains 3 to 20, more preferably 6 to 20, and even more preferably 8 to 20 carbon atoms.

$R^1$ in Formula (1) may comprise an oxygen atom. In this case, $R^1$ may contain 1 to 20, 1 to 10, 1 to 5, 1 to 3, or 1 to 2 oxygen atoms, or may contain one oxygen atom.

$R^1$ in Formula (1) may in particular comprise an ether bond. In this case, $R^1$ may comprise 1 to 20, 1 to 10, 1 to 5, 1 to 3, or 1 to 2 ether bonds, or may comprise one ether bond.

Preferably, $R^1$ in Formula (1) consists of carbon atoms and hydrogen atoms and optional oxygen atom(s).

In Formula (1), $R^1$ may comprise an (linear or branched) aliphatic moiety, alicyclic moiety, and/or aromatic moiety.

When $R^1$ in Formula (1) contains an alicyclic moiety, an increase in the molecular bulk leads to an increases in the molar volume, and it may be possible to obtain an effect of reducing tan δ of a capacitor. Further, due to the bulkiness and rigidity, it may be possible to inhibit the micro-Brownian motion of backbone segments in the three-dimensional network of a polymer caused by an elevated temperature, and as a result of which it may be possible to provide a capacitor having a relatively high glass transition temperature and excellent heat resistance. Further, since the shrinkage of resin thin film layers due to curing is relatively suppressed, the interlayer adhesion in a capacitor can be further improved.

When $R^1$ in Formula (1) contains an aromatic moiety, the presence of a I-electron conjugated system results in a polarization from dipole orientation which is larger than a simple alkyl skeleton, and thus a relatively large dielectric constant can be obtained. Furthermore, in particular when $R^1$ comprises a bulky structure such as a biphenyl structure, it may be possible to obtain an effect of lowering tan δ of a capacitor, as described above with respect to the alicyclic moiety. Further, since the shrinkage of resin thin film layers due to curing is relatively suppressed, the interlayer adhesion in a capacitor can be further improved.

In Formula (1), $R^1$ preferably does not contain an unsaturated bond. By not containing an unsaturated bond, it may be possible to suppress an increase of tan δ of a capacitor.

Exemplary chemical structures M1 to M6 of the polyfunctional monomer which can be used in the present invention are as shown below.

[Chem. 2]

M1

M2

M3

M4

M5

M6

"n" in Formulae M3 and M4 may each be 1 to 20, preferably 5 to 18, more preferably 8 to 15, and even more preferably 9 to 12.

"n" in Formulae M5 and M6 may each be 1 to 20, preferably 1 to 10, more preferably 2 to 6, and even more preferably 3 to 4.

Examples of preferable chemical structures of the polyfunctional monomer are shown below.

[Chem. 3]

M1

M2

M3-12

M4-12

M3-9

M4-9

M6-3

Particularly preferable polyfunctional monomers include:
tricyclodecanedimethanol diacrylate,
tricyclodecane dimethanol dimethacrylate,
dodecane-1,12-diyl dimethacrylate,
dodecane-1,12-diyl diacrylate,
α,α'-[propane-2,2-diylbis-(4,1-phenylene)]bis[ω-(acryloyloxy) poly(oxyethylene)].

Monofunctional Monomer

The monofunctional monomer preferably comprises an acrylate group or a methacrylate group. The monofunctional monomer most preferably comprises an acrylate group. In another embodiment, the monofunctional monomer preferably comprises a monomer having an acrylate group or a methacrylate group, or consists of a monomer having an acrylate group or a methacrylate group. The monofunctional monomer most preferably comprises or consists of a monomer having an acrylate group.

In one embodiment according to the present disclosure, the monofunctional monomer may have a chemical structure represented by the following general Formula (2).

[Chem. 4]

(2)

In Formula (2),
$R^3$ is a group having 1 to 20 carbon atoms;
$R^2$ is H or $CH_3$.
$R^2$ in Formula (2) is preferably H.
$R^3$ in Formula (2) preferably has 3 to 20, more preferably 6 to 20 and even more preferably 8 to 20 carbon atoms.
$R^3$ in Formula (2) may comprise an oxygen atom. In this case, $R^3$ may contain 1 to 20, 1 to 10, 1 to 5, 1 to 3, 1 to 2 oxygen atoms, or one oxygen atom.
$R^3$ in the Formula (2) may in particular comprise an ether bond. In this case, $R^3$ may comprise 1 to 20, 1 to 10, 1 to 5, 1 to 3, 1 to 2 ether bonds, or one ether bond.

Preferably, $R^3$ in Formula (2) consists of carbon atoms and hydrogen atoms and optional oxygen atom(s).

In Formula (2), $R^3$ may comprise an (linear or branched) aliphatic moiety, alicyclic moiety, and/or aromatic moiety.

When $R^3$ in Formula (2) contains an alicyclic moiety, an increase in molecular bulk results in an increase in the molar volume, and thus it may be possible to obtain an effect of reducing tan δ of a capacitor. Further, due to the bulkiness and rigidity, it may be possible to inhibit the micro-Brownian motion of backbone segments in the three-dimensional network of a polymer caused by an elevated temperature, and as a result of which it may be possible to provide a capacitor having a relatively high glass transition temperature and excellent heat resistance. Further, since the shrinkage of resin thin film layers due to curing is relatively suppressed, the interlayer adhesion in a capacitor can be further improved.

When $R^3$ in Formula (2) contains an aromatic moiety, the presence of a I-electron conjugated system results in a polarization from dipole orientation which is larger than a simple alkyl skeleton, and a relatively large dielectric constant can be obtained. Furthermore, in particular when $R^3$ comprises a bulky structure such as a biphenyl structure, it may be possible to obtain an effect of lowering tan δ of a capacitor, as described above with respect to the alicyclic moiety. Further, since the shrinkage of resin thin film layers due to curing is relatively suppressed, the interlayer adhesion in a capacitor can be further improved.

$R^3$ particularly preferably has a biphenyl structure.

In Formulae (2), $R^3$ preferably does not contain an unsaturated bond. By not including an unsaturated bond, it may be possible to suppress an increase in tan δ of a capacitor.

Exemplary chemical structures S1 to S8 and S'1 to S'4 of the monofunctional monomer which can be used in the present invention are as shown below.

[Chem. 5]

S1

S2

S3

S4

S5

S6

S7

-continued

S8

S6-17

S7-15

Particularly preferable monofunctional monomers include:
2-(biphenyl-2-yloxy)-ethyl acrylate,
4-phenylbenzyl acrylate,
2-[(tricyclo[5.2.1.0(2,6)]deca-4-en-9-yl)oxy]ethyl acrylate,
2-[(tricyclo[5.2.1.0(2,6)]deca-4-en-9-yl)oxy]ethyl methacrylate.

As particularly preferable combinations for the first monomer and the second monomer, mention may be made of the following combinations (1) and (2):

(1) A combination of tricyclodecanedimethanol diacrylate and 2-(biphenyl-2-yloxy)-ethyl acrylate;
(2) A combination of tricyclodecanedimethanol diacrylate and 4-phenylbenzyl acrylate.

In one embodiment of the present invention, at least one of the first monomer and the second monomer comprises an acrylate or methacrylate group (i.e., an acrylate or methacrylate monomer), or at least one of the first monomer and the second monomer comprises a monomer having an acrylate or methacrylate group (i.e., an acrylate or methacrylate monomer).

In one embodiment of the present invention, both the first monomer and the second monomer have an acrylate or methacrylate group (i.e., acrylate or methacrylate monomers), or both the first monomer and the second monomer comprise a monomer having an acrylate or methacrylate group (i.e., acrylate or methacrylate monomer).

In one embodiment of the present invention, the first monomer is tricyclodecane dimethanol diacrylate or tricyclodecane dimethanol dimethacrylate, or the first monomer comprises tricyclodecane dimethanol diacrylate or tricyclodecane dimethanol dimethacrylate,
and/or
the second monomer is 2-(biphenyl-2-yloxy)-ethyl acrylate or 4-phenylbenzyl acrylate, or the second monomer comprises 2-(biphenyl-2-yloxy)-ethyl acrylate or 4-phenylbenzyl acrylate.

HLB Value

In one embodiment according to the present disclosure, the capacitor according to the present invention satisfies the condition (a) described above; namely, an HLB value $H_2$ of the second monomer which is a monofunctional monomer is less than an HLB value $H_1$ of the first monomer which is a polyfunctional monomer.

An HLB value is an index indicating the degree of affinity to water and oil, and is calculated based on the types of functional groups constituting a monomer. The higher the HLB value, the more hydrophilic a monomer tends to be. An HLB value can be calculated according to the Davis Method.

Preferably, the difference between an HLB value $H_1$ of the first monomer and an HLB value $H_2$ of the second monomer ($H_1$-$H_2$) is 0.1 or more. The difference "($H_1$-$H_2$)" is more preferably 0.2 or more, 0.3 or more, 0.4 or more, or 0.5 or

S'1

S'2

S'3

S'4

"n" in Formulae S1 and S2 and S'1 and S'2 may each be 0 to 20, preferably 1 to 10, more preferably 1 to 5, still more preferably 1 to 3 or 1 to 2, and most preferably n=1.

"n" in Formulae S5 and S6 may each be 1 to 20, preferably 5 to 18, more preferably 12 to 16.

"n" in Formulae S7 and S8 may each be 1 to 20, preferably 10 to 20, more preferably 12 to 18, and even more preferably 14 to 16.

Exemplary chemical structures of preferable monofunctional monomer are as shown below.

[Chem. 7]

S1-1

S3 more, and/or 3.0 or less, 2.5 or less, 2.0 or less, 1.9 or less, 1.8 or less, 1.7 or less, 1.6 or less, 1.5 or less, 1.4 or less, 1.3 or less, or 1.2 or less.

Preferably, an HLB value $H_1$ of the first monomer is between 3.0 and 5.0. This range is more preferably 3.1 or more, 3.2 or more, 3.3 or more, 3.4 or more, 3.5 or more, 3.6 or more, 3.7 or more, 3.8 or more, 3.9 or more, or 4.0 or more, and/or is 4.9 or less, 4.8 or less, 4.7 or less, 4.6 or less, 4.5 or less, 4.4 or less, or 4.3 or less.

Further, preferably, an HLB value $H_2$ of the second monomer is between 2.0 and 4.0. This range is more preferably 2.1 or more, 2.2 or more, 2.3 or more, 2.4 or more, 2.5 or more, 2.6 or more, 2.7 or more, 2.8 or more, 2.9 or more, or 3.0 or more, and/or 3.9 or less, 3.8 or less, 3.7 or less, 3.6 or less, 3.5 or less, 3.4 or less, 3.3 or less, or 3.2 or less.

An HLB value $H_1$ of the first monomer and an HLB value $H_2$ of the second monomer can be calculated based on the Davis Method.

By way of example, HLB values calculated based on the Davis Method for some exemplary polyfunctional monomers and monofunctional monomers are listed below in Table 1.

TABLE 1

| Name | HLB value | monomer | Chemical structure of monomer |
|---|---|---|---|
| tricyclodecane dimethanol diacrylate | 4.2 | bi-functional monomer | |
| tricyclodecane dimethanol dimethacrylate | 3.3 | bi-functional monomer | |
| dodecane-1,12-diyl diacrylate | 4.2 | bi-functional monomer | |
| dodecane-1,12-diyl dimethacrylate | 3.3 | bi-functional monomer | |
| α,α'-[propane-2,2-diylbis-(4,1-phenylene)]bis[ω-(acryloyloxy)poly(oxyethylene)] | 4.1 | bi-functional monomer | (m + n = 4) |
| nona-1,9-diyl diacrylate | 5.6 | bis functional monomer | |
| nona-1,9-diyl dimethacrylate | 5.9 | bi-functional monomer | |
| triethylene glycol dimethacrylate | 8.7 | bi-functional monomer | |
| 2-(biphenyl-2-yloxy)-ethyl acrylate | 3.1 | mono-functional monomer | (n = 1) |

TABLE 1-continued

| Name | HLB value | monomer | Chemical structure of monomer |
|---|---|---|---|
| 4-phenylbenzyl acrylate | 2.3 | mono-functional monomer | |
| Isoocta decyl acrylate | −0.1 | mono-functional monomer | |
| n-octadecyl methacrylate | −0.6 | mono-functional monomer | |
| 2-[(tricyclo[5.2.1.0 (2,6)]deca-4-en-9-yl)oxy]ethyl acrylate | 4.0 | mono-functional monomer | |
| 2-[(tricyclo[5.2.1.0 (2,6)]deca-4-en-9-yl)oxy]ethyl methacrylate | 3.6 | mono-functional monomer | |

Calculation of HLB Value by Davis Method

An HLB value can be calculated according to the Davis Method using equation (A) below:

$$HLB \text{ value}=7+\Sigma \text{ (index number of hydrophilic group)}+\Sigma \text{ (index number of lipophilic group)} \quad (A)$$

Index numbers for major hydrophilic groups are as follows:

ester group (—COO—): 2.4
hydroxyl group (—OH): 1.9
ether group (—O—): 1.3
(—CH$_2$CH$_2$O—): 0.33

Index numbers for major lipophilic groups are as follows:

alkane (—CH$_2$—): −0.475
methyl group (—CH$_3$): −0.475
alkene (—CH═): −0.475
(—CH$_2$CH(CH$_3$)O—): −0.15

For example, in the case of tricyclodecanedimethanol dimethacrylate, the HLB value can be calculated as follows:

ester group=2
alkane=12
alkene=2×2
methyl group=2, from these values and based on the above-listed index numbers, HLB value=3.25 (approx. 3.3).

It should be noted that the cyclic structure in the molecular structure of tricyclodecanedimethanol dimethacrylate and methylene group(s) directly bonded thereto are all deemed to be alkanes (the cyclic structure is composed of a total of 10 alkanes).

Further, for example, in the case of 2-(biphenyl-2-yloxy)-ethyl acrylate, the HLB value can be calculated as follows:

ester group=1
alkene=2±6×2
(—CH$_2$CH$_2$O—)=1 from these values and based on the above index number,

HLB value=3.08 (approx. 3.1).

It should be noted that the two benzene rings in the molecular structure of 2-(biphenyl-2-yloxy)-ethyl acrylate are deemed to be each composed of six alkenes.

Water Absorption Rate

In another embodiment according to the present disclosure, the capacitor according to the present invention satisfies the condition (b) described above; namely, when a first polymer member formed using only the first monomer as a monomer and a second polymer member formed using only the second monomer as a monomer are produced according to the manufacturing method (1) described above and a water absorption rate is measured for each of the polymer members after each of them are left for 40 hours under the conditions of 40° C. and 95% relative humidity, the water absorption rate of the second polymer member is less than the water absorption rate of the first polymer member.

The difference between the water absorption rate (%) of the second polymer member and the water absorption rate (%) of the first polymer member may be greater than or equal to 0.05. This difference is preferably 0.1 or more, 0.2 or more, or 0.3 or more. The upper limit of this difference is not particularly limited, but may be, for example, 2.0 or less.

The water absorption rate of the first polymer member may be 0.5% to 2.0%. The water absorption rate of the first polymer member is preferably 0.7% or more, 0.8% or more, 0.9% or more, and/or 1.8% or less, 1.6% or less, 1.4% or less, or 1.2% or less.

The water absorption rate of the second polymer member may be 0.1% to 1.0%. The water absorption rate of the first polymer member is preferably 0.2% or more, 0.3% or more, 0.4% or more, and/or 1.0% or less, 0.9% or less, 0.8% or less, or 0.7% or less.

The water absorption rates of the first polymer member and the second polymer member can be calculated from the weight change of a polymer member when subjected to a water absorption test in which the polymer member to be measured is left under the conditions of 40° C. and 95% relative humidity for 40 hours.

In other words, the weight change (%) can be calculated from the value of the weight of a polymer member measured before the water absorption test and the weight of the polymer member measured immediately after the water absorption test, and this weight change (%) can be used as the water absorption rate. In particular, the weight change (%) can be calculated according to the following formula:

Weight change (%)=100×(weight after water absorption test-weight before water absorption test)/weight before water absorption test.

Method for Manufacturing First and Second Polymer Members

The first polymer member and the second polymer member for measuring a water absorption rate are manufactured according to the manufacturing method (1).

The manufacturing method (1) consists of:
providing the first monomer or the second monomer as a test monomer;
mixing a photoinitiator in a ratio of 0.2±0.01 moles to 100 moles of the test monomer, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to obtain a disk-shaped polymer member with dimensions of 30 mm diameter×1 mm depth.

For the first monomer or the second monomer provided as a test monomer, reference may be made to the above description.

The photoinitiator can be appropriately selected depending on the type of the test monomer. Specific photoinitiators include 2-benzyl-2-dimethylamino-4'morpholinobutyrophenone. The mixing of the test monomer and the photoinitiator can be carried out according to known methods.

The round dish is dimensioned such that, when a mixture placed therein is subjected to a polymerization with UV radiation, a disk-shaped polymer member having dimensions of 30 mm diameter by 1 mm depth is formed. Specifically, for example, the round dish may be a round dish having a planar area of 30 mm inner diameter and 1 to 5 cm depth, and the mixture may be poured into the round dish so as to be 1 mm height.

UV radiation is carried out so as to cause polymerization of the test monomer and is carried out at 120 W intensity and at a 250 mm distance from the sample.

The duration of the UV irradiation is determined according to the type of the test monomer, in particular so that the polymerization of the test monomer (i.e. the curing of the mixture) fully proceeds, and is performed until polymerization no longer occurs even when further UV irradiation is provided. One skilled in the art could determine the duration of such UV radiation depending on the type of the test monomer. For example, if the test monomer is an acrylate monomer (a monomer having an acrylate group), UV radiation can be applied for 60 seconds. Further, if, for example, the test monomer is a methacrylate monomer (a monomer having a methacrylate group), UV radiation can be performed for 360 seconds. If the test monomer has an acrylate group and a methacrylate group, UV radiation can be carried out for 360 seconds.

Thin-Film Polymer Laminated Capacitor

The thin-film polymer laminated capacitor according to the present invention has a structure wherein resin thin film layers and internal electrode metal layers are alternately laminated.

Figure 1:
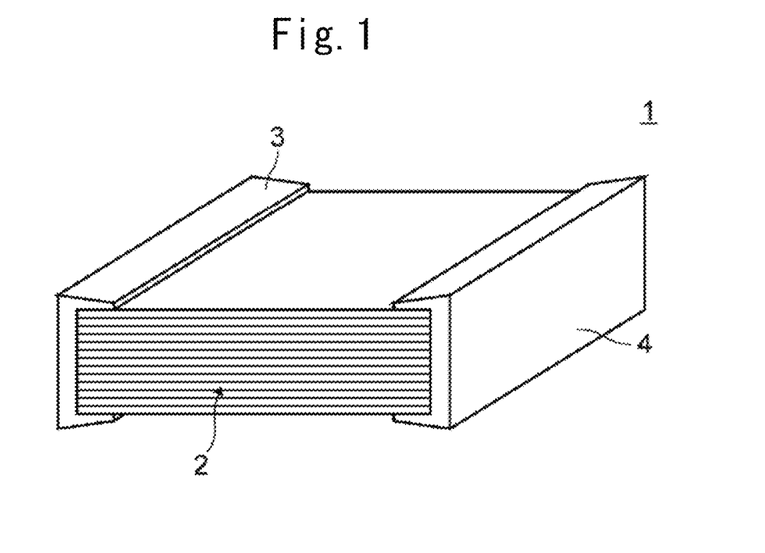
FIG. 1 is a perspective schematic view of a thin-film polymer laminated capacitor 1.

FIG. 1 is a perspective schematic view of a thin-film polymer laminated capacitor 1. The thin-film polymer laminated capacitor 1 has a laminate 2 in which resin thin film layers and metal thin film layers (i.e., internal electrode metal layers) are alternately laminated, wherein two external electrodes 3 and 4 are attached to the laminate 2.

The thin-film polymer laminated capacitor can have 10 to 10,000 layers, 50 to 5,000 layers, or 100 to 2,000 layers.

The resin thin film layers may have a 10 nm to 3000 nm thickness, preferably a 100 to 1500 nm thickness.

Examples of metal material constituting the internal electrode metal layer include at least one selected from the group consisting of Al, Cu, Zn, Sn, Au, Ag and Pt, and combinations thereof.

The internal electrode metal layer may have 1 nm to 100 nm thickness, preferably 10 nm to 40 nm thickness. Further, the metal thin film layer preferably has a vapor-deposition resistance of 1 to 502/0, 5 to 4002/u, or 5 to 302/0.

Relative Permittivity

Preferably, the capacitor according to the present invention has a relative permittivity of 2.0 or more as measured at 25° C. and 1 kHz. The relative permittivity is more preferably 2.1 or more, 2.2 or more, 2.3 or more, or 2.5 or more. The upper limit of the relative permittivity is not particularly limited, but may be 5.0 or less. The relative permittivity at 25° C. and 1 kHz can be calculated based on the capacitance measured using a LCR meter and the electrode area and the thickness of the dielectric.

Tan δ

Further, preferably, the capacitor of the present invention has tan δ (also referred to as dielectric dissipation factor or loss factor) of less than 1.0% when measured at 25° C. and 1 kHz. The tan δ is more preferably 0.9% or less, 0.8% or less, 0.7% or less, 0.6% or less, 0.5% or less, 0.4% or less, 0.3% or less, 0.2% or less, or 0.1% or less. The lower limit of tan δ is not particularly limited, but may be 0.05% or more.

Further, preferably, the capacitor of the present invention has tan δ of less than 0.01 when measured at 25° C. and 1 kHz. The tan δ is more preferably 0.009 or less, 0.008 or less, 0.007 or less, 0.006 or less, 0.005 or less, 0.004 or less, 0.003 or less, 0.002 or less, or 0.001 or less. The lower limit of tan δ is not particularly limited, but may be 0.0005 or more.

The tan δ at 25° C. and 1 kHz can be measured using a LCR meter.

Water Absorption Rate of Capacitor

Preferably, with respect to the capacitor, when a third polymer member manufactured according to the following manufacturing method (2) is left for 40 hours under the conditions of 40° C. and 95% relative humidity, the water absorption rate of the third polymer member is 0.8% or less.

This water absorption rate of the third polymer member is preferably 0.7% or less, 0.6% or less, 0.5% or less, or 0.4% or less. The lower limit of the water absorption rate of the third polymer member is not particularly limited, but may be, for example, 0.01% or more.

Manufacturing Method (2): Manufacturing Method of Third Polymer Member

The manufacturing method (2) for producing the third polymer member consists of:

providing the first monomer and the second monomer;
mixing the first monomer and the second monomer at the same ratio as the molar ratio in the resin thin film layer, in order to obtain a monomer mixture;
mixing a photoinitiator in a ratio of 0.2±0.01 moles to 100 moles of the monomer mixture, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

For details of the manufacturing method (2) for manufacturing the third polymer member, reference can be made to the above description regarding the manufacturing method (1).

Method for Manufacturing Capacitor

The method for manufacturing the thin-film polymer laminated capacitor according to the present invention is not particularly limited.

For example, the thin-film polymer laminated capacitor according to the present invention can be manufactured by a method comprising alternately repeating, on a rotary drum in a vacuum chamber, a step of forming a resin thin film layer and a step of forming a metal thin film layer by vapor-deposition of a metal material, in order to manufacture, on the rotary drum, a laminate having alternately laminated resin thin film layers and metal thin film layers.

For a method of alternately laminating resin thin film layers and metal thin film layers on a rotary drum in this manner, a known method can be used, and for example the method described in WO 2015/118693 can be used.

The laminate formed on a rotary drum as above may be removed from the rotary drum and pressed under heating to planarize (flatten) the laminate. Then, after the planarized laminate is cut into sticks, external electrodes are formed and then cut into chips, in order to obtain a thin-film polymer laminated capacitor.

Preferably, the thin-film polymer laminated capacitor according to the present invention can be manufactured according to the following manufacturing method of the present invention.

Method for Manufacturing Capacitor of the Present Invention

A method of manufacturing a thin-film polymer laminated capacitor having a structure in which resin thin film layers and internal electrode metal layers are alternately laminated, wherein the method comprises curing a monomer layer comprising a first monomer which is a polyfunctional monomer and a second monomer which is a monofunctional monomer, in order to form a resin thin film layer;
and wherein the first monomer and the second monomer satisfy at least one of the following conditions (a) and (b):
(a) an HLB value $H_2$ of the second monomer is less than an HLB value $H_1$ of the first monomer,
(b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) consists of:

providing the first monomer or the second monomer as a test monomer;
mixing a photoinitiator in a ratio of 0.2±0.01 moles to 100 moles of the test monomer, in order to obtain a mixture;
pouring the mixture into a round dish; and
irradiating the mixture poured into the round dish with UV in a nitrogen atmosphere under the conditions of 120 W and 250 mm distance until polymerization no longer occurs, in order to produce a disk-shaped polymer member with a dimension of 30 mm diameter×1 mm depth.

For details of the manufacturing method according to the present invention, reference may be made to the above descriptions regarding the capacitor according to the present invention. In particular, with regard to the manufacturing method (1), the condition (a) and the condition (b), reference may be made to the above descriptions regarding the capacitor according to the present invention.

When a resin thin film layer is formed, the "curing" treatment can be performed according to a known method, and can be performed, for example, according to the method described in WO 2015/118693. Specifically, for example, a monomer layer can be formed by vapor-depositing a monomer in a vacuum chamber and then the monomer layer can be subjected to irradiation with an electron beam so as to cure the monomer layer.

EXAMPLES

Hereinafter, the present invention will be described in more detail with reference to Examples. The present invention is not limited to the examples.

Reference Examples 1 to 3

(Water Absorption Test)

In Reference Examples 1 to 3, monomers shown in Table 2 below were evaluated for water absorption using a polymer mass (a polymer member).

Reference Example 1

In Reference Example 1, tricyclodecanedimethanol diacrylate (manufactured by Shin-Nakamura Chemical Co., Ltd., product name: A-DCP), which is a bifunctional monomer, was used as a test monomer, and a polymer member was prepared as follows:

tricyclodecanedimethanol diacrylate was provided as a test monomer;
a photoinitiator (2-benzyl-2-dimethylamino-4'-morpholinobutyrophenone, manufactured by Tokyo Chemical Industry Co., Ltd.) was mixed with the test monomer at a ratio of 0.2±0.01 mol to 100 mol of the test monomer, so as to form a mixture;
the mixture was poured into a round dish; and
the mixture poured into the round dish was UV-irradiated in a nitrogen atmosphere under the conditions of 120 W and 250 mm distance until polymerization no longer occurs, so as to prepare a disk-shaped polymer member having a dimensions of 30 mm diameter by 1 mm depth.

Since the test monomer of Reference Example 1 was a monomer having an acrylate group, the mixture was subjected to UV radiation for 60 seconds so that the polymerization (i.e. the curing process) fully occurs. Even if the polymer was somewhat deformed, it was used as it was for water absorption evaluation.

The obtained polymer member was subjected to a water absorption test. Specifically, the polymer member was placed in a chamber of constant temperature and humidity set at 40° C. and 95% relative humidity, and left for 40 hours. Afterwards, the weight change before and after the water absorption test was measured, and this was defined as the water absorption rate. The results are shown in Table 2 below.

Reference Example 2

In Reference Example 2, the water absorption test of a polymer member was carried out in the same manner as in Reference Example 1, except that 2-(biphenyl-2-yloxy)-ethyl acrylate (manufactured by Shin-Nakamura Chemical Co., Ltd., product name: A-LEN-10), which is a monofunctional monomer, was used as a test monomer instead of tricyclodecane dimethanol diacrylate. The result is shown in Table 2 below. The test monomer of Reference Example 2 is a monomer having an acrylate group.

Reference Example 3

In Reference Example 3, the water absorption test of a polymer member was carried out in the same manner as in Reference Example 1, except that a mixture of tricyclodecanedimethanol diacrylate and 2-(biphenyl-2-yloxy)-ethyl acrylate (molar ratio: 50:50) was used as a test monomer instead of tricyclodecane dimethanol diacrylate. The result is shown in Table 2 below.

TABLE 2

| | poly-functional monomer | Mono-functional monomer | HLB value | Water Absorption Rate (%) |
|---|---|---|---|---|
| Reference Example 1 | Tricyclodecane dimethanol diacrylate | — | 4.2 | 1.11 |
| Reference Example 2 | — | 2-(biphenyl-2-yloxy)-ethyl acrylate | 3.1 | 0.33 |
| Reference Example 3 | Tricyclodecane dimethanol diacrylate | 2-(biphenyl-2-yloxy)-ethyl acrylate | — | 0.53 |

As seen in Table 2, the polymer member formed from 2-(biphenyl-2-yloxy)-ethyl acrylate (Reference Example 2) exhibited relatively low water absorption rate as compared with the polymer member formed from tricyclodecanedimethanol diacrylate (Reference Example 1).

Furthermore, as seen in Table 2, the polymer member formed from a mixture of tricyclodecanedimethanol diacrylate and 2-(biphenyl-2-yloxy)-ethyl acrylate (Reference Example 3) exhibited relatively low water absorption as compared with the polymer member formed from tricyclodecanedimethanol diacrylate only (Reference Example 1).

These results show that, by combining a polyfunctional monomer exhibiting a relatively high water absorption as measured on a polymer member and a monofunctional monomer exhibiting a relatively low water absorption as measured on a polymer member, a polymer having a reduced water absorption rate can be obtained.

Further, Table 2 also shows HLB values calculated according to the Davis Method for each of the monomers. As can be seen in Table 2, when calculated according to the Davis Method, the HLB value of 2-(biphenyl-2-yloxy)-ethyl acrylate, which is a monofunctional monomer, is 3.1 and the HLB value of tricyclodecanedimethanol diacrylate, which is a bifunctional monomer, is 4.2. Thus, 2-(biphenyl-2-yloxy)-ethyl acrylate has a lower HLB value than tricyclodecanedimethanol diacrylate. The results in Table 2 show that there is a correlation between HLB values of monomers and water absorption rates as measured on a polymer member.

Example 1 and Comparative Example 1

In Example 1 and Comparative Example 1, a capacitor comprising resin thin film layers formed from a monomer or monomer mixture shown in Table 3 below was manufactured, and durability was evaluated.

Example 1

Manufacture of Thin-Film Polymer Laminated Capacitor

A laminate in which resin thin film layers and metal thin film layers (internal electrode metal layers) were alternately laminated in a total of 2,550 layers was produced on a rotary drum, by alternately and repeatedly performing, on the rotary drum in a vacuum chamber, a step of forming a resin thin film layer and a step of forming a metal thin film layer.

In the step of forming a resin thin film layer, a resin thin film layer was formed from a monomer mixture containing tricyclodecanedimethanol diacrylate (product name: A-DCP, manufactured by Shin-Nakamura Chemical Co., Ltd.) as a bifunctional monomer and 2-(biphenyl-2-yloxy)-ethyl acrylate (product name: A-LEN-10, manufactured by Shin-Nakamura Chemical Co., Ltd.) as a monofunctional monomer in a molar ratio of 50:50. More specifically, a monomer layer was formed by vapor-depositing this mixture of the monomers in a vacuum chamber, and then the monomer layer was irradiated with an electron beam to cure the monomer layer, in order to form the resin thin film layer. The electron-beam irradiation was performed under the conditions of the accelerating voltage 5.0 kV and the irradiation current 50 mA. The thickness of the resin thin film layer was 0.5 μm.

In the step of forming a metal thin film layer, aluminum (Al) was vapor-deposited as a metal material on a resin thin film layer wherein a partial region of the resin thin film was masked by a vapor-application of fluorine oil, in order to form a metal thin film layer. The vapor-deposition resistance of the metal thin film layer was 10Ω/□.

The laminate thus produced was removed from the rotary drum and pressed under heating at 160° C. to planarize (flatten) the laminate. Afterwards, the planarized laminate was cut into sticks, and then external electrodes (thermal sprayed material of brass metallicon, copper plating, and tin plating) were attached thereto, and then further cut into chips, in order to obtain a thin-film polymer laminated capacitor according to Example 1. The capacitor was sized as 4.5 mm×3.2 mm.

Humidity Resistance Environmental Test

The durability of the capacitor according to Example 1 was evaluated by a humidity resistance environmental test. In this humidity resistance environmental test, a capacitor was placed in a chamber of constant temperature and humidity having conditions of 60° C. temperature and 90% relative humidity, and the capacitor was left for 1000 hours under application of a DC-voltage 50V.

The tan δ (dielectric dissipation tangent) and capacitance were measured before and after the humidity resistance environmental test. The tan δ was measured using a LCR meter at the conditions of 25° C. and 1 kHz. Capacitance (μF) of a capacitor was measured using a LCR meter at the conditions of 25° C. and 1 kHz. The results are shown in Table 3 below.

Evaluation of Water Absorption of Capacitor

In Example 1, the water absorption of a capacitor was further evaluated according to the following water absorption test.

Specifically, a capacitor was placed in a chamber of constant temperature and humidity having 40° C. temperature and 95% relative humidity, and the weight change of the capacitor after being left for a predetermined time was measured, and this was used as the water absorption rate of the capacitor. The results are shown in Table 3 below and FIG. 2.

In Table 3 below, the water absorption for each of the capacitors were evaluated according to the following criteria:
- ○ (Good): The water absorption rate measured after the above water absorption test for 500 hours was less than 1%.
- x (Poor): The water absorption rate measured after the above water absorption test for 500 hours was 1% or more.

Comparative Example 1

In Comparative Example 1, a capacitor was manufactured and evaluated in the same manner as in Example 1, except that only tricyclodecanedimethanol diacrylate (manufactured by Shin-Nakamura Chemical Co., Ltd., product name: A-DCP), which is a bifunctional monomer, was used instead of the monomer mixture. The results are shown in Table 3 below and FIG. 2.

nol diacrylate, which is a bifunctional monomer. Specifically, an increase in tan δ and a decrease in capacitance (ΔC<0) were observed.

Contrary to this, in the case of the capacitor of Example 1, a relatively good tan δ was maintained even after the humidity resistance environmental test, and a decrease in capacitance was not observed (ΔC>0).

Figure 2:
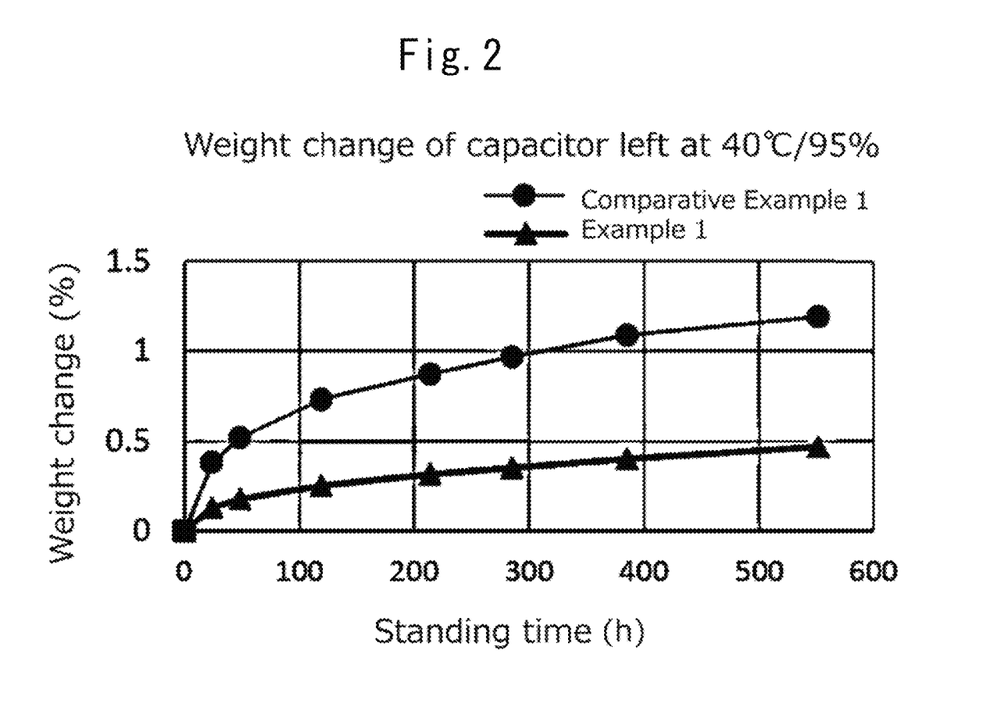
FIG. 2 is a graph showing the results of measurements of water absorption rates for capacitors according to Example 1 and Comparative Example 1.

Further, as can be seen in Table 3 and FIG. 2, the capacitor according to Example 1 exhibited excellent water absorption (i.e., relatively reduced water absorption) compared to the capacitor according to Comparative Example 1.

From above results, it can be understood that a thin-film polymer laminated capacitor having both good electric performance and excellent durability can be provided by combining a polyfunctional monomer and a monofunctional monomer having specific HLB values, or by combining a polyfunctional monomer and a monofunctional monomer exhibiting specific water absorption rates as measured on a polymer member. Without wishing to be bound by theory, it is believed that in such a capacitor, the use of a polyfunctional monomer ensures sufficient degree of crosslinking of a polymer structure in resin thin film layers, and the use of a monofunctional monomer, which provides a polymer with a relatively low water absorption, results in reduced water absorption properties of the capacitor, and as a result, good electrical properties and excellent durability of the capacitor can be achieved.

The invention claimed is:

1. A thin-film polymer laminated capacitor having a structure in which resin thin film layers and internal electrode metal layers are alternately laminated,
    wherein the resin thin film layers have a polymer structure formed by a polymerization of a first monomer which is a polyfunctional monomer and a second monomer which is a monofunctional monomer,
    and wherein the first monomer and the second monomer satisfy at least one of the following conditions (a) and (b):
    (a) an HLB value $H_2$ of the second monomer is less than an HLB value $H_1$ of the first monomer;

TABLE 3

| | poly-functional monomer | Mono-functional monomer | tan δ 0 (hr) % | tan δ 1000 (hr) % | Capacitance 0 (hr) μF | Δ C % | Water Absorption |
|---|---|---|---|---|---|---|---|
| Example 1 | Tricyclodecane dimethanol diacrylate | 2-(biphenyl-2-yloxy)-ethyl acrylate | 0.37 | 0.55 | 0.913 | 5.2 | ○ |
| Comparative Example 1 | Tricyclodecane dimethanol diacrylate | — | 0.80 | 2.60 | 0.917 | −5.7 | X |

As can be seen in Table 3, with respect to the initial properties, the capacitors of Example 1 and Comparative Example 1 both exhibited good initial capacitance (μF). The initial tan δ value of Example 1 was better than that of Comparative Example 1.

On the other hand, with respect to the properties after the humidity resistance environmental test, a decrease in performance was observed in the capacitor of Comparative Example 1 manufactured using only tricyclodecanedimetha- (b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) comprises:

providing the first monomer or the second monomer as a test monomer;

mixing a photoinitiator in a ratio of 0.2±0.01 moles to 100 moles of the test monomer, in order to obtain a mixture;

pouring the mixture into a round dish; and irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

2. The capacitor according to claim 1, wherein a difference between the HLB value $H_1$ of the first monomer and the HLB value $H_2$ of the second monomer ($H_1$-$H_2$) is 0.1 or more.

3. The capacitor according to claim 2, wherein the difference ($H_1$-$H_2$) is 0.5 or more.

4. The capacitor according to claim 1, wherein the HLB value $H_1$ of the first monomer is in the range of 3.0 to 5.0, and the HLB value $H_2$ of the second monomer- is in the range of 2.0 to 4.0.

5. The capacitor according to claim 1, wherein the molar ratio of the first monomer to the second monomer is 10:90 to 90:10.

6. The capacitor according to claim 1, wherein at least one of the first monomer and the second monomer has an acrylate group or a methacrylate group, or at least one of the first monomer and the second monomer comprises a monomer having an acrylate group or a methacrylate group.

7. The capacitor according to claim 6, wherein both the first monomer and the second monomer have an acrylate group or a methacrylate group, or both the first monomer and the second monomer comprise a monomer having an acrylate group or a methacrylate group.

8. The capacitor according to claim 1, wherein the first monomer is a bifunctional monomer.

9. The capacitor according to claim 1, wherein the first monomer is tricyclodecanedimethanol diacrylate or tricyclodecanedimethanol dimethacrylate, or the first monomer comprises tricyclodecanedimethanol diacrylate or tricyclodecanedimethanol dimethacrylate;

and/or the second monomer is 2-(biphenyl-2-yloxy)-ethyl acrylate or 4-phenylbenzyl acrylate, or the second monomer comprises 2-(biphenyl-2-yloxy)-ethyl acrylate or 4-phenylbenzyl acrylate.

10. The capacitor according to claim 1, wherein, for a third polymer member produced according to the following manufacturing method (2), when being left for 40 hours under the conditions of 40° C. and 95% relative humidity, the water absorption rate of the third polymer member is 0.8% or less, wherein the manufacturing method (2) comprises:

providing the first monomer and the second monomer;

mixing the first monomer and the second monomer at the same ratio as the molar ratio in the resin thin film layer, in order to obtain a monomer mixture;

mixing a photoinitiator in a ratio of 0.2±0.01 moles to 100 moles of the monomer mixture, in order to obtain a mixture;

pouring the mixture into a round dish; and irradiating the mixture poured into the round dish with UV in a nitrogen atmosphere under the conditions of 120 W and 250 mm distance until polymerization no longer occurs, in order to produce a disk-shaped polymer member with dimensions of 30 mm diameter×1 mm depth.

11. The capacitor according to claim 1, wherein the capacitor has a relative permittivity of 2.0 or more as measured at 25° C. and 1 kHz, and tan δ of less than 1.0% as measured at 25° C. and 1 kHz.

12. A method of manufacturing a thin-film polymer laminated capacitor having a structure in which resin thin film layers and internal electrode metal layers are alternately laminated, wherein the method comprises:

curing a monomer layer comprising a first monomer which is a polyfunctional monomer and a second monomer which is a monofunctional monomer, in order to form the resin thin film layer;

and wherein the first monomer and the second monomer satisfy at least one of the following conditions (a) and (b):

(a) an HLB value $H_2$ of the second monomer is less than an HLB value $H_1$ of the first monomer, (b) when a first polymer member formed using only the first monomer as a monomer and a second polymer member formed using only the second monomer as a monomer are produced according to the following manufacturing method (1) and a water absorption rate is measured for each of the polymer members after being left for 40 hours under the conditions of 40° C. and 95% relative humidity, the water absorption rate of the second polymer member is less than the water absorption rate of the first polymer member, wherein the manufacturing method (1) comprises:

providing the first monomer or the second monomer as a test monomer;

mixing a photoinitiator in a ratio of 0.2±0.01 moles to 100 moles of the test monomer, in order to obtain a mixture;

pouring the mixture into a round dish; and irradiating the mixture poured into the round dish with UV in a nitrogen atmosphere under the conditions of 120 W and 250 mm distance until polymerization no longer occurs, in order to form a disk-shaped polymer member with dimensions of 30 mm diameter×1 mm depth.

\* \* \* \* \*